Nov. 16, 1965  D. B. PRICE  3,217,923
BEVERAGE MAKER
Filed Sept. 23, 1963

WITNESSES

INVENTOR
David B. Price
BY

United States Patent Office 3,217,923
Patented Nov. 16, 1965

3,217,923
BEVERAGE MAKER
David B. Price, Mansfield, Ohio, assignor to Westinghouse Electric Corporation, Pittsburgh, Pa., a corporation of Pennsylvania
Filed Sept. 23, 1963, Ser. No. 310,703
1 Claim. (Cl. 220—82)

The present invention relates to beverage makers, and more particularly, to beverage makers having brew level indicators incorporated therein.

Home beverage makers, especially coffee makers, do not provide a visual indication of the amount of liquid within the maker. To ascertain how much beverage remains in the maker, the user must either: resort to memory, as to how many cups have been used; or make a weight judgment by lifting the device; or remove the cover of the maker and look inside. Also, in filling the maker initially, it is necessary for the user to rely on inside indicia for filling the device to the required number of cups or use an external measuring device to determine the required amount.

Transparent riser tubes have been used in commercial coffee makers to determine the quantity of liquid within the maker. The riser tube method of level indication has also been used in household coffee makers, however, with the disadvantage that it is difficult to clean the riser tube. It would also be advantageous to provide a level indicator to aid in filling the beverage maker without resorting to indicia within the container of the maker.

It is therefore an object of the present invention to provide a beverage maker having an improved level indicator which is readily cleanable and of low cost.

It is a further object of the present invention to provide a coffee maker having an improved level indicator which may be readily affixed to the maker without the need of other securing means.

Broadly, the above cited objects are accomplished by incorporating into an aperture in a beverage maker a transparent indicating window having a deformable cross-section which is rigidly held in place by crimping the wall of the beverage maker around the aperture against the window.

These and other objects of the present invention will become more apparent when considered in view of the following specification and drawings, in which.

Figure 1:
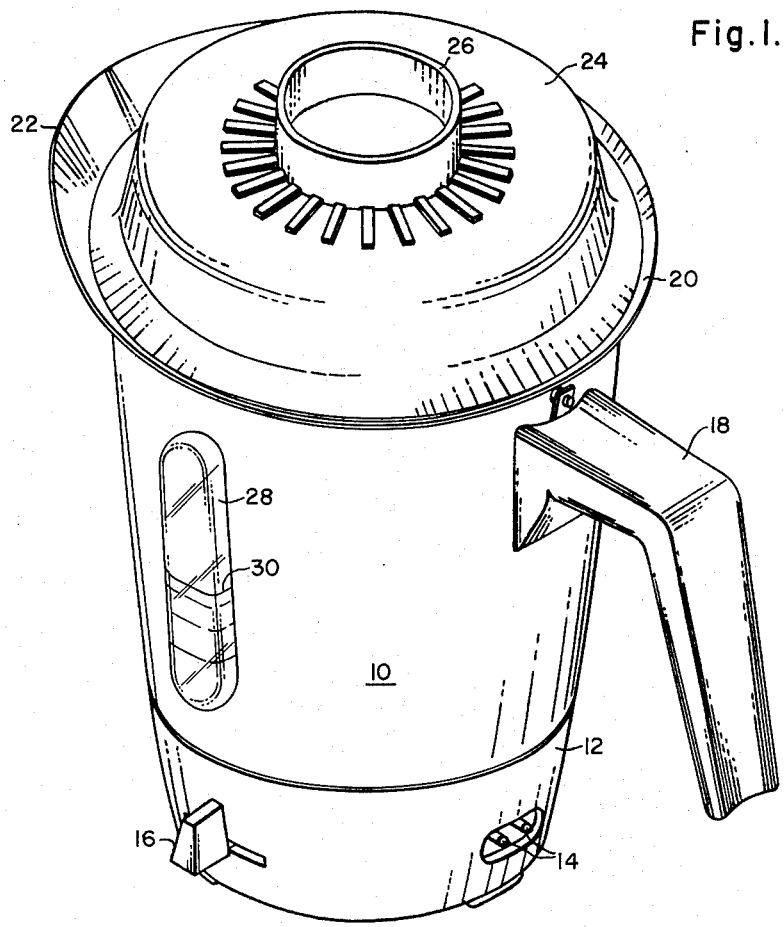
FIGURE 1 is a isometric sketch showing the level indicator of the present invention.

Referring to FIG. 1, an electric coffeepot of the automatic variety is shown. The coffee maker has a liquid containing vessel 10 of a substantially cylindrical shape. The vessel 10 fits over a base member 12. Electric current from an external source, not shown, is applied to the male terminal 14 disposed in the base member 12 so that heating energy may be applied to a beverage in the container. A control lever 16 is incorporated into the mechanism of the base member 12 so that the strength of the coffee or beverage may be controlled, as is well known in the art. A handle 18 is secured to the outside wall of the vessel 10, for pouring and handling purposes. The vessel 10 has a top outwardly extending flange 20, the front portion 22 of which serves as a pouring spout for the maker. Fitted over the open top end of the vessel 10 is the top cover member 24. A combined percolator bulb and cover handle or knob 26 is disposed at the top of the cover member 24 in the usual manner.

A brew level indicator window 28 is disposed in the side wall of the vessel 10. The level indicator comprises a polycarbonate plastic material, for example, and is light transparent so that a viewer may see from the outside the level of the liquid within the vessel 10, as is shown, for instance, to a level 30. The level indicator 28 is fitted into a longitudinal aperture which is cut into the side of the vessel 10.

Figure 2:
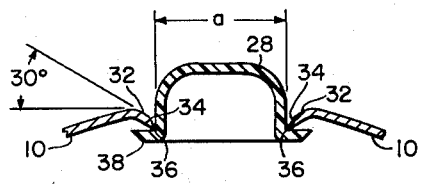
FIG. 2 is a sectional view of the level indicator before crimping of the wall of the beverage maker.

FIG. 2 shows the indicator window 28 fitted into the aperture in the vessel 10 but before the window is secured in its final position. To secure the indicator window 28 to the vessel 10 a longitudinal aperture is cut into the side wall of the vessel 10. A flange 32 is bent inwardly preferably from the side of the vessel at approximately 30° from the original curvature of the wall, as shown in FIG. 2. A gripping portion 34 is provided around the inside edge of the aperture by tapering the inside edge of the flange 32 from the outside to the inside. A sharpened edge 36 is thus provided all around the aperture.

The indicator window 28 has an arcuate cross-section and is deformable across the cross-section. The window 28 has a back flange 38 which is at substantially right angles to the curved portion of the window adjoining thereto.

The window 28 is fitted into the aperture in the vessel 10 from the inside of the vessel. The back flange 38 extending around the window 28 fits under the flange 32 of the vessel 10. The window 28 thus provides a concave surface to the inside of the vessel 10. It should be noted that the sharpened edge 36 of the flange 32 fits into the junction of the back flange 38 and the curved portion of the indicator window 28. The cross-sectional dimension $a$ of the undeformed indicator window is so selected that the sharp edge 36 will engage the junction of the back flange 38 and the curved portion of the window 28.

Figure 3:
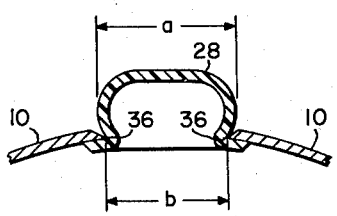
FIG. 3 is a sectional view of the level indicator in its secured position.

The final step in rigidly securing the window 28 to the vessel 10 is to crimp the flange 32 so that the 30° angle is reduced to 0°, that is, the flange 32 is now flush with the rest of the surface of the vessel wall. FIG. 3 shows the window 28 in its secured position. The crimping of the flange 32 causes the cross-section of the window 28 to be deformed inwardly so that the dimension "$b$," between the junctions at the edge 36, is smaller than the original cross-sectional dimension "$a$." The deformed cross-section of the window 28 takes substantially the shape of the Greek letter omega ($\Omega$).

The window 28 is securely held to the vessel 10 by two mechanisms. One of these is due to the reaction force of the deformed flexible plastic window 28 against the edge of the aperture of the vessel 10. The other is by the sharp edge 36 cutting into the plastic material of the window 28. By use of this securing method no additional sealing means such as a gasket or cement is required. The pinching of the cross-section of the window provides a reaction force and a high force concentration at the sharp edge 36 against the plastic of the window, and, therefore, causes a high strength seal to be formed completely around the window making it water tight.

It should be noted that the cross-section of the window 28 need not necessarily be arcuate or concave relative to the inside of the vessel 10. The cross section of the indicator may be solid, if a soft enough plastic material is used so that the sharp edge 36 engaging into the material will be sufficient of itself to seal the indicator window to the wall of the vessel, when the flange 32 is crimped against the window.

Although the present invention has been described with a certain degree of particularity, it should be understood that the present disclosure has been made only by way of example and that numerous changes in the details of construction and the combination and arrangement of parts

I claim as my invention:

A beverage maker comprising a vessel having bottom and side walls, said vessel side wall having an opening therethrough, the material of said wall adjacent said opening being tapered to a relatively sharp edge, and a beverage level indicator window mounted in, and closing, said opening, said window being made of a light transparent and resilient material and having in cross section an enlarged body portion joined to a base portion by a reduced neck portion, the enlarged body portion being located exteriorly of the vessel and the base portion being located within the vessel with the neck portion biased into sealing engagement with the sharp edge of the vessel material defining the opening by the inherent resiliency of the window material.

References Cited by the Examiner

UNITED STATES PATENTS

| | | | |
|---|---|---|---|
| 2,177,191 | 10/1939 | Sandberg | 29—520 |
| 2,533,578 | 12/1950 | Gomersall | 220—82 |
| 3,060,562 | 10/1962 | Fransson | 29—520 |

References Cited by the Applicant

FOREIGN PATENTS 561,646  10/1957  Belgium.

LOUIS G. MANCENE, *Primary Examiner.*

THERON E. CONDON, *Examiner.*